United States Patent [19]
Nakano

[11] Patent Number: 4,891,799
[45] Date of Patent: Jan. 2, 1990

[54] OPTICAL HEAD APPARATUS FOR WRITING AND READING DATA ON AN OPTICAL DISK HAVING A LENS WITH AN INCLINED OPTICAL AXIS

[75] Inventor: Takayuki Nakano, Kosai, Japan

[73] Assignee: Fuji Electrochemical Co., Ltd., Tokyo, Japan

[21] Appl. No.: 122,230

[22] Filed: Nov. 18, 1987

[30] Foreign Application Priority Data

Mar. 13, 1987 [JP] Japan ................................. 62-36844
Mar. 16, 1987 [JP] Japan ................................. 62-60655

[51] Int. Cl.$^4$ ............................................. G11B 7/09
[52] U.S. Cl. ....................................... 369/45; 369/46; 369/112; 250/201; 350/6.3
[58] Field of Search ......................... 369/44–46, 369/100, 105, 106, 112; 350/247, 252, 255, 6.3; 250/201 DF, 202

[56] References Cited

U.S. PATENT DOCUMENTS

| | | | |
|---|---|---|---|
| 3,969,573 | 7/1976 | Bouwhuis et al. | 369/112 X |
| 3,969,575 | 7/1976 | Gerritsen et al. | 369/112 X |
| 4,436,260 | 3/1984 | Donelan | 350/6.3 X |
| 4,613,202 | 9/1986 | Kuriyama | 369/44 X |
| 4,656,618 | 4/1987 | Kaku et al. | 369/45 X |
| 4,725,721 | 2/1988 | Nakamura et al. | 369/45 X |
| 4,730,899 | 3/1988 | Kime et al. | 369/112 X |
| 4,769,803 | 9/1988 | Yamamiya | 369/46 |

Primary Examiner—Robert L. Richardson
Assistant Examiner—W. R. Young
Attorney, Agent, or Firm—Fleit, Jacobson, Cohn, Price, Holman & Stern

[57] ABSTRACT

An optical head apparatus is adapted to write and read data onto and from an optical disk using an optical beam emitted from a light-emitting element. Such an optical head apparatus includes: a lens actuator having a lens casing for retaining an objective, magnetic circuits provided on two sides of the lens casing, a coil having a part placed in the gaps formed by the magnetic circuits; a focus detector having a detection lens assembly consisting of a plurality of lenses for correcting aberration, a divided photodetector for receiving a light beam which has been converged by being passed through the detection lens assembly, and a differential amplifier for taking out a differential output from the divided photodetector, the detection lens assembly, the divided photodetector, and the differential amplifier being disposed in the optical path of light reflecting from the optical disk. The detection lens assembly has a lens which is the closest lens to the focal point thereof, the center line of at least a focal point side interface of the lens is inclined with respect to the optical axes of the other lenses.

7 Claims, 6 Drawing Sheets

OPTICAL HEAD APPARATUS FOR WRITING AND READING DATA ON AN OPTICAL DISK HAVING A LENS WITH AN INCLINED OPTICAL AXIS

BACKGROUND OF THE INVENTION

The present invention relates to an optical head apparatus for writing data onto an optical disk, or for reading data recorded on the optical disk, by employing an optical beam irradiated from a light-emitting element. More specifically, the present invention relates to a detecting device for use in focusing an objective by a servomechanism in the optical head apparatus, and to a lens actuator for the optical head which supports an objective so that it can move in a focusing direction and a tracking direction perpendicular to the focusing direction, and drives it in those two directions.

In general, optical heads using semiconductor lasers have been used to write data onto optical disks or read the data therefrom. In such an optical head, which converges a laser beam by an objective and irradiates the converged beam onto a predetermined position on the optical disk, irradiation of the laser beam must be controlled in such a manner that the irradiated light spot focuses on the signal surface of the optical disk to ensure that the data is read or written correctly, so the objective of the optical head is focused by a servomechanism.

Conventionally, various different methods have been proposed as detection devices for use in focusing the objective by a servomechanism. One example is a device which utilizes astigmatism. This device has a condenser lens, a cylindrical lens for converging rays of light in one direction alone, and a four-part photodetector, all these components being disposed in the optical path of light reflected from the optical disk in order to form an astigmatic image. The four-part photodetector is mounted at a location at which a beam whose cross-sectional shape is a true circle appears when the laser beam is accurately focused on the signal surface by the objective. Therefore, when the objective is moved closer to or further away from the optical disk, the beam shape is changed to an ellipse which is elongated in either of two directions perpendicular to each other by the action of the cylindrical lens, and a focusing error signal can be detected by first adding the outputs of diagonals of the four-part photodetector, then obtaining the difference therebetween.

This known technique, therefore, requires a cylindrical lens in addition to a condenser lens, thus increasing the number of parts and hence the optical path. Further, the optical parts in the detection section must be positioned with high accuracy.

In order to converge and focus the laser beam by the objective accurately onto a predetermined position on the optical disk, the objective is movably supported so that it is movable in the focusing direction and the tracking direction perpendicular to the focusing direction, and can be driven in those two directions. Currently, electromagnetic force generated by the interaction of the current flowing through a coil and the external magnetic fields is utilized to drive the objective. Various supporting structures for the objective have been proposed, the typical examples including the axial rotation and sliding method and the spring method. A supporting device which adopts the shaft sliding method has a lens casing with a lens mounted on a portion of the casing which is separated from the central shaft. The lens casing is capable of sliding along the central shaft and rotating about the central shaft within a predetermined range. In the spring method, a freely movable lens casing is supported by a plurality of springs.

In both shaft sliding and leaf spring supporting methods, however, it is difficult to restrict the generation of jitter and to reduce frictional resistance at the same time. It is desirable for the lens casing to be supported in such a manner as to movable solely in the focusing direction (in the same direction as the optical axis of a lens) and the tracking direction perpendicular to the focusing direction and not to be movable in other directions, because movement of the lens casing in the direction perpendicular to the focusing and tracking directions generates noise associated with the time axis, i.e., jitter. In addition, movement of the lens casing in the focusing and tracking directions must be conducted with a minimal degree of friction.

In the shaft sliding method, the shaft is area-contacted with the lens casing. Therefore, to restrict the generation of jitter, the backlash of the fitting of two components must be minimized, this resulting in an increase in the frictional resistance. In the spring method, since the lens casing is supported by a plurality of springs alone, frictional resistance is low. However, movement in a direction other than the focusing and tracking directions is not restricted, furthermore wave aberration at the recording surface is generated, and jitter thereby readily increases.

SUMMARY OF THE INVENTION

In view of the above-mentioned problems of the prior art, an object of the present invention is to provide an optical head apparatus with a focus detection device, the focus detection device enabling the size thereof to be reduced by simplification of the structure of a photodetector section and reduction in the optical path, without requiring highly accurate positioning of the optical components employed, and enabling production costs to be reduced as a whole.

Another object of the present invention is to provide an optical head apparatus with a lens actuator, the lens actuator being improved so as to be capable of restricting the generation of jitter and reducing frictional resistance.

In order to attain the above-described object, the present invention provides a focus detection device for an optical head which includes a detection lens assembly consisting of a plurality of lenses, and a divided photodetector, both the detection lens assembly and the divided photodetector being disposed within the optical path of light reflected from an optical disk surface.

The detection lens assembly is composed of a plurality of lenses for correcting aberration, and the center line of at least the focal point side interface of a focal point side lens in the assembly is inclined with respect to the optical axes of the other lenses so as to ensure that a substantially linear diffraction pattern is formed. A differential output of the diffraction pattern is taken out by the divided photodetector.

To construct a lens assembly in the simplest manner, the lens in the lens assembly which is located closest to the focal point of the lens assembly is inclined with respect to the optical axes of the other lenses. However, a lens having an inclined focal point side interface may be incorporated as a focal point side lens.

The divided photodetector preferably is disposed at a position which substantially corresponds to the focal point of the detection lens assembly. If necessary, however, it may be spaced therefrom.

When the center line of at least the focal point side interface of the focal point side lens in the lens assembly is inclined with respect to the optical axes of the other lenses, a linear diffraction pattern is formed at the divided photodetector located at substantially the focal point position of the lens assembly. The diffraction pattern moves in a direction perpendicular to the direction in which the pattern is extended in accordance with the position of the objective with respect to the optical disk surface, i.e., as the object moves closer to or further away from the optical disk.

The present invention utilizes this phenomenon, and a focus error signal is detected by taking out a differential output by means of the divided photodetector.

In order to detect the focus error signal, the photodetector is disposed in a state wherein the linear diffraction pattern is aligned with the divided portion of the divided photodetector. However, the divided portion may be inclined with respect to the linear diffraction pattern so as to effect adjustment of the detection sensitivity.

When the divided photodetector is located beyond the focal point of the detection lens assembly, a diffraction pattern consisting of a plurality of lines appears. The intensity of the light of the diffraction pattern changes as the objective moves toward or further away from the optical disk, and the diffraction pattern thereby deviates in a direction perpendicular to the direction in which the pattern lines are extended. This effect can also be utilized in focus detection. In such a case, high accuracy is not required for the assembly of optical components, and the ease of manufacture, or working property, is therefore improved.

In an improved lens actuator for an optical head, one of the opposing surfaces of each of the magnetic yokes and the lens casing forms a curved and protruded surface which has a generatrix running parallel to the optical axis of the lens, whereby the lens casing can slide against the magnetic yokes through the line-contacts. It is desirable for the lens casing to be retained by curved leaf springs.

In the above-mentioned structure, since the lens casing slides against the magnetic yokes while contacting them along lines parallel to the optical axis of the lens, it can be moved in the focusing and tracking directions but is completely prevented from moving in a direction perpendicular to these directions (in a jitter direction). Furthermore, the line-contacts of the lens casing with the magnetic yokes ensures smooth movement of the lens casing in the focusing and tracking directions with a very small degree of frictional resistance.

Since the lens casing is line-contacted with the magnetic yokes in the direction which is parallel to the optical axis of the lens, even if it is driven in the focusing direction over a large distance, it does not tilt. In addition, in order to provide a line-contact, formation of only a curved, column-shaped surface can be readily machined with high accuracy is necessary.

In an optical head which constitutes another aspect of the present invention, a plurality of curved leaf springs are providedd for each side of the lens casing in such a manner that they are separated from each other. The curved leaf springs also serve as electric leads for a focus coil and track coils, and a reflector is mounted on a base member so that light can pass between the adjacent curved leaf springs located on one side, substantially parallel to an optical disk surface.

The lens casing is supported by four curved leaf springs which are mounted on two sides thereof so that there are two for each side in such a manner as to be movable in the focusing and tracking directions. The winding ends of the focus coil and the track coils are electrically connected to the four curved lealf spring so as to be connected to an external circuit therethrough. Since the plurality of track coils are connected in series, they have only two winding ends, enabling the winding ends of the focal coil and the track coils to be processed with the four curved leaf springs.

Further, since two curved leaf springs are provided on each of the two sides of the lens casing in such a manner as to be separated from each other, space is created between the adjacent curved leaf springs which can be utilized as a light path. In other words, if a reflector is mounted on a base plate, the optical path can be formed in such a manner as to form substantially a right angle with the optical axis of the objective. This enables an optical system to be disposed on the side of the lens casing parallel to the optical disk surface, thereby greatly reducing the thickness of the apparatus.

In another example of the lens supporting structure for the optical head, the lens casing for retaining the objective is supported by the curved leaf springs provided on two sides thereof in such a manner as to be movable in the focusing and tracking directions. Each of the curved leaf springs has slits along its curved surface.

There is no limitation to the number of curved leaf springs or to their shape, and the number or shape can be suitably selected in accordance with the weight or vibration characteristics of the lens casing.

If the curved surface of the leaf spring is provided with slits, the modulus of elasticity thereof can be changed without reducing its tensile strength. The leaf spring is required to have a certain thickness so as to provide the connecting portions of the leaf spring at which it is connected to the lens spring and the apparatus body with sufficient tensile strength. In the present invention, the leaf spring has a certain thickness as a whole to prevent reduction in the tensile strength and degradation of fatigue characteristics. However, if the thickness of the leaf spring is too large, the modules of elasticity thereof in the focusing direction becomes too large, resulting in difficulty in provision of suitable vibration characteristics.

The slits formed on the curved surface of the leaf spring have a function of reducing the modulus of elasticity. In other words, it is possible to provide the leaf spring with mechanical vibrations which fit the weight and shape of the lens casing by changing the number or shape of the slits.

PREFERRED EMBODIMENTS OF THE INVENTION

Figure 1:
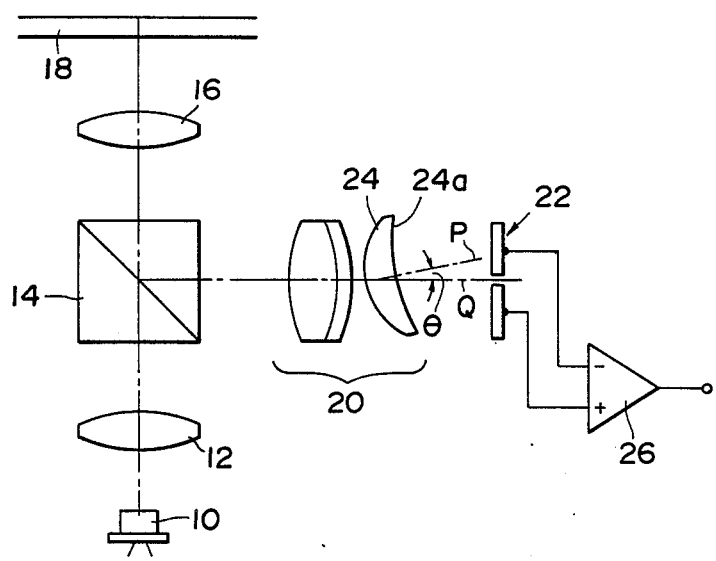
FIG. 1 shows the basic structure of a focus detection device according to the present invention.

In FIG. 1 which shows a basic structure of a focusing detection apparatus of the present invention, a tracking detection system is not shown for the purpose of simplification of the description.

Light emitted from a semiconductor laser 10 passes through a collimeter 12 and a beam splitter 14, and is directed to an objective 16 by which it is converged, and then irradiated onto the signal surface of an optical disk 18. Light reflected from the optical disk 18 passes first through the objective 16 then through the beam splitter 14 in which its returning optical path is bent at a right angle. The light is then converged by being passed through a detection lens assembly 20 which comprises a plurality of lenses (three lenses in this embodiment) to correct aberration, and is directed to a two-part photodetector 22.

In this embodiment, the center line P of at least a focal point side interface 24a of a focal point side lens 24 of the detection lens assembly 20 is inclined with respect to the optical axes Q of the other lenses, as shown in FIG. 1, and the differential output from a divided photodetector (a two-part photodetector in this embodiment) is taken out.

In this embodiment, the entirety of the focal point side lens 24 is inclined with respect to the optical axes Q of the other lenses by an angle $\theta$, and the outputs of the two-part photodetector 22 are respectively supplied to a differential amplifier 26 where they are differentially amplified.

Figure 2A:
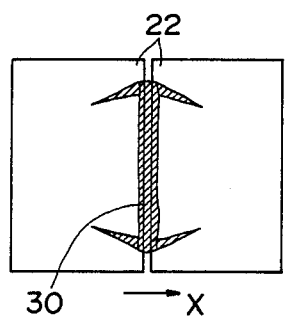
FIG. 2A shows a diffraction pattern formed by the device of FIG. 1.

Although the optical inclination angle of the focal point side lens 24 differs in accordance with the refractive index, curvature, and structure of the lens, when the angle wsa set to about 10 degrees and the two-part photodetector 22 was disposed substantially at the focal point position of the detection lens assembly 20 in experiments conducted by using combined lenses having a numerical aperture of 0.5 which are generally used as objectives, a linear diffraction pattern 30 such as that shown in FIG. 2A was obtained.

Figure 2B:
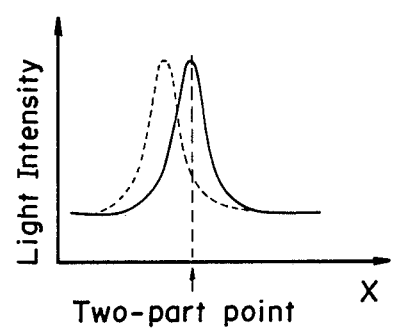
FIG. 2B is a graph of the intensity of the light of the diffraction pattern shown in FIG. 2A.

FIG. 2A shows the diffraction pattern 30 generated at the two-part photodetector 22 which is located substantially at the focal point position of the detection lens assembly, and FIG. 2B shows a light intensity distribution of the diffraction pattern when the objective is focused and a light intensity distribution when the objective is located too close to the optical disk, the first distribution being indicated by a solid line and the second distribution being indicated by a broken line.

Figure 3:
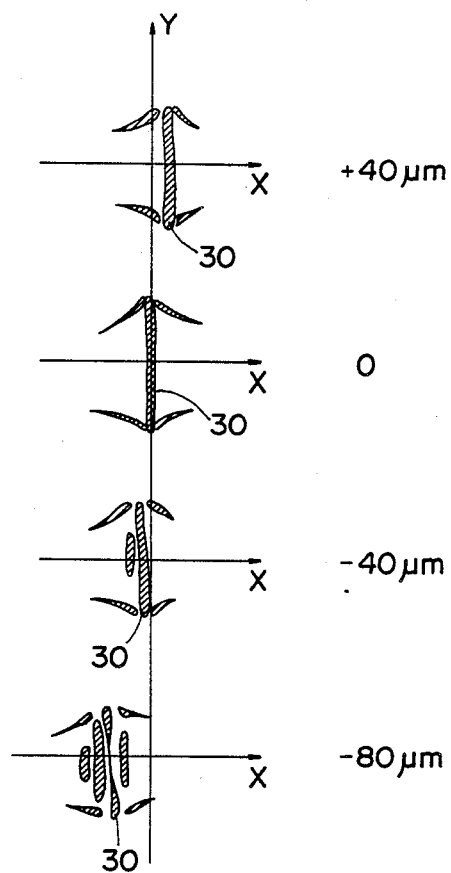
FIG. 3 illustrates the relation between the distance between an objective and an optical disk and the diffraction pattern.

The results shown in FIGS. 2A and 2B are shown in FIG. 3 in a more detailed manner. When the objective is located too close to or too distant from the surface of the optical disk, the linear diffraction pattern 30 moves in the direction perpendicular to the direction in which it is extended (in a direction indicated by X) at the position of the two-part photodetector. If the objective moves too far from the optical disk surface, the diffraction pattern 30 which is located at the center when the objective is focused deviates in the $+X$ direction (by $+40$ $\mu$m). Reversely, the diffraction pattern 30 deviates in the $-X$ direction (by $-40$ $\mu$m), if the objective moves too close to the optical disk surface. If the objective moves even closer to the optical disk surface, the diffraction pattern 30 which is composed of one line is divided into several lines, and at the same time the entirety of the pattern further deviates in the $-X$ direction (by $-80$ $\mu$m). Therefore, how much the objective is shifted from a focused position can be detected by taking out the differential output of the two-part photodetector.

Figure 4:
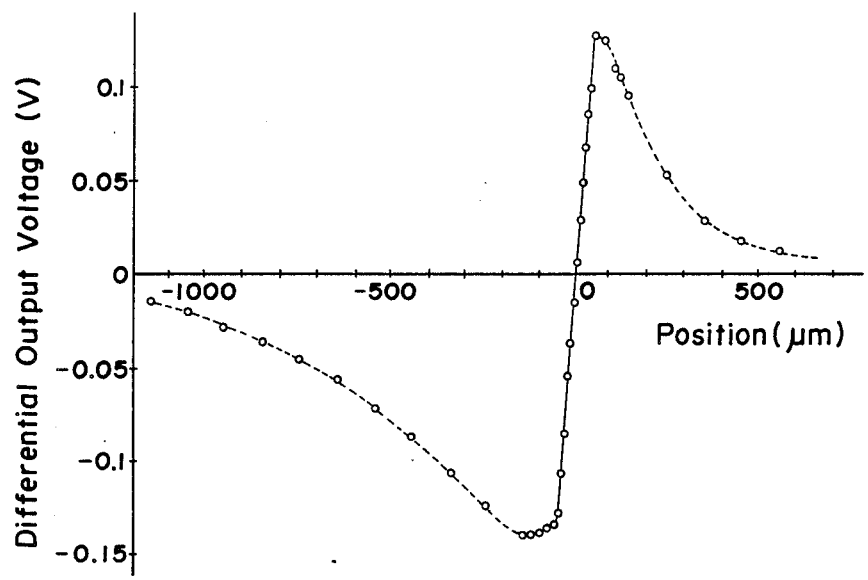
FIG. 4 is a graph showing the relation between the position of the objective and the differential output from a two-part photodetector.

FIG. 4 is a plot of the differential output voltage which has been taken out while the objective which was located very far from the optical disk surface moved to a position at which it was extremely close to the optical disk. In an actual focusing control, focusing operation of the objective is performed by a servomechanism within a range in the vicinity of focusing which is indicated by the solid line. In this range, the differential output voltage changes in a linear pattern with respect to the position of the objective, so that a very excellent focusing control is obtained.

Figure 5:
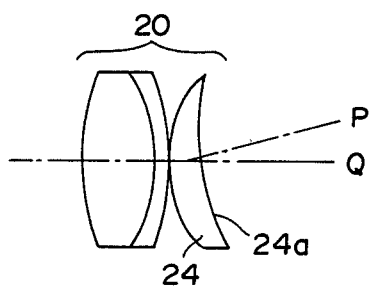
FIG. 5 shows another example of a detection lens assembly that can be used in the present invention.

In FIG. 5 showing another example of the detection lens assembly can be employed in the present invention, a special lens which has the focal point side interface 24a the center line P of which is inclined with respect to the optical axes Q of the other lenses is used as the focal point side lens 24. Such a special lens ensures the same effect as that obtained with a focal point side lens whose entirety is inclined, and a desired diffraction pattern can be provided.

Figure 6:
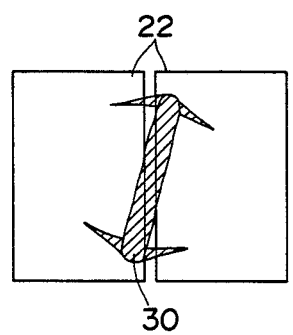
FIG. 6 shows another example of the arrangement of the two-part photodetector.

Another example of the arrangement of the two-part photodetector is shown in FIG. 6. In this example, the two-part photodetector 22 is which is located substantially at the focal point position of the detection lens assembly 20 is slightly inclined with respect to the generated substantially linear diffraction pattern so as to enable adjustment of the detection sensitivity.

Figure 7A:
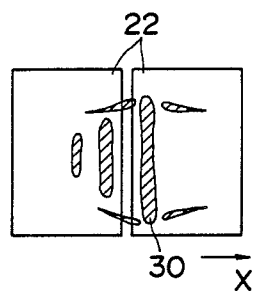
FIG. 7A shows still another example of the arrangement of the two-part photodetector.
Figure 7B:
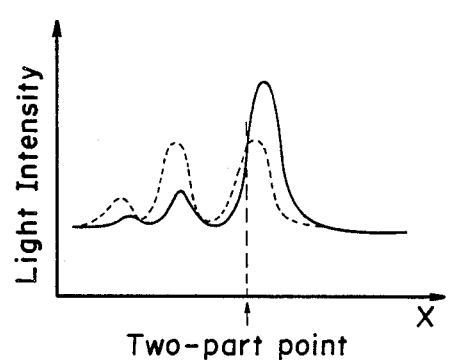
FIG. 7B is a graph of the light intensity of a diffraction pattern obtained by the two-part photodetector of FIG. 7A.

FIGS. 7A and 7B show still another example of the arrangement of the two-part photodetector. In this example, the two-part photodetector 22 is disposed closer to the detection lens assembly 20 than the position of the focal point thereof. In this case, a diffraction pattern which consists of a plurality of lines appears. If the diffferential output voltage of the right and left photodetector elements is adjusted in such a manner that it is reduced to zero when the objective is focused, a differential output signal is output by the changed light intensity of the diffraction pattern when the objective is not focused, and the focusing operation of the objective can be conductd by a servomechanism on the basis of the output signal. The broken line in FIG. 7B indicates the light intensity which is changed as the objective is moved too close to the optional disk.

If a four-part photodetector (not shown) is employed in place of the two-part photodetector 22, it is possible to detect a track error using the reflected light from the pre-grooved optical disk by the push-pull method.

As has been described above, in the present invention, a substantially linear diffraction pattern is formed in the divided photodetector by providing the detection lens assembly in such a manner that the center line of at least the foccl point side interface of the focal point side lens in the assembly of the plurality of the detection lenses is inclined with respect to the optical axes of the other lenses, and a focus signal is taken out from the differential output of the divided photodetector. In consequence, combined lenses which are used to correct aberration such as those used as objectives can be employed as a detection lens assembly, thereby reducing the production costs. Since the optical path in the detection section is reduced, the size of the device can be reduced. Further, very accurate positioning of the optical components is not required, and a focus control can be made simple and at a high sensitivity.

Figure 8:
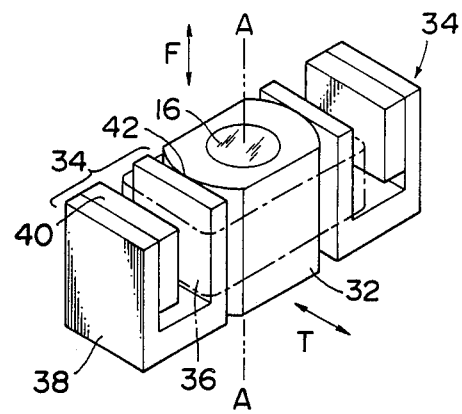
FIG. 8 is a perspective view of an essential part of an example of a lens actuator for an optical head; which is employed in the optical head apparatus according to the present invention.

FIG. 8 shows the essential part of one example of a lens actuator for an optical head according to the present invention. This lens actuator includes a lens casing 32 for retaining an objective 16, magnetic circuits 34 disposed on two sides of the lens casing 32, and a coil 36 fixed to the lens casing 32, part of the coil 36 being placed in the gaps of the magnetic circuits 34. Each of magnetic circuits 34 has a U-shaped magnetic yoke 38, and a permanent magnet 40 attached to the inner surface of one of the projected portions of the magnet yoke 38.

In this invention, one of the opposing surfaces of each of the magnetic yokes and the lens casing is curved and protruded in such a manner that it has a generatrix which runs parallel to the optical axis of the lens, so as to ensure that the lens casing can slide against the magnetic yokes in a line-contact manner.

In the example shown in FIG. 8, the surface of each of the magnetic yokes 38 at which it faces the lens casing is made flat, whereas the surface of the lens casing at which it faces each of the magnetic yokes is shaped into a curved surface 42, so that the lens casing 32 makes contact with the magnetic yokes 38 in lines parallel to the optical axis A—A of the objective 16.

Figure 9:
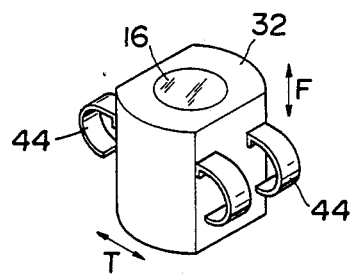
FIG. 9 is a perspective view of a supporting mechanism using leaf springs which is suitable for use in the actuator of FIG. 8.

The side walls of the lens casing 32 are provided with curved leaf springs 44 which are to be described in detail later, as shown in FIG. 9, by which the lens casing 32 is supported in such a manner as to be movable in a focusing direction F and a tracking direction T.

The coil 36 comprises a focusing coil wound around the lens casing 32 in such a manner that it passes through the magnetic gaps and that it surrounds the side walls of the lens casing 32, and two square-shaped tracking coils are attached to the focusing coil in the corresponding magnetic gap.

The thus-formed lens actuator for the optical head is operated as follows: when a current flows in the focusing coil which is wound around the lens casing 32 in a toroidal fashion with respect to the central axis of the casing, a force is generated in the magnetic gaps in the focusing direction F by the interaction of the magnetic fields and the current, as in a generally known voice coil. The lens casing is displaced to a position at which the objective 16 is focused as the result of a balance between the resilient forces of the leaf springs 44 and the generated force. When a current flows through the square-shaped tracking coils placed within the magnetic gaps, a force is generated in the tracking direction T by the interaction of the magnetic fields and the current, by means of which a tracking operation is performed.

Since the lens casing 32 is positioned at its two sides by the line-contacts with the magnetic yokes, movement of the lens casing in the directions (in the jitter directions) perpendicular to the focusing direction F and the tracking direction T is prohibited, and no jitter is generated. Further, since the lens casing moves in the focusing direction F and the tracking direction T while line-contacting with the magnetic yokes, frictional resistance is greatly reduced. Smooth movement can be realized with a small amount of drive current, and responsiveness is increased.

Figure 10:
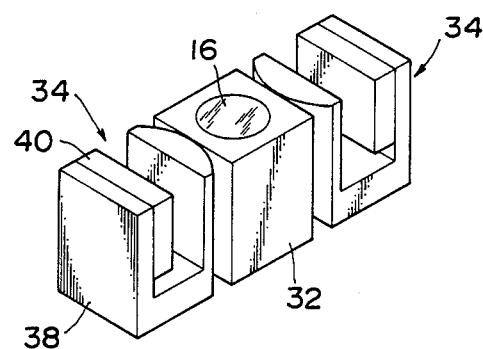
FIG. 10 is a perspective view of an essential part of another example of the actuator.

FIG. 10 shows another example of the lens actuator. The basic structure of this example is the same as that of the previous example shown in FIG. 8, and like reference numerals are therefore used to designate the parts corresponding to those in FIG. 8, the description thereof being omitted. This example is different from the previous one in that a curved, protruding surface is formed on each of the magnetic yokes while the surfaces of the lens casing are made flat. This arrangement also ensures that the lens casing 32 slides against the magnetic yokes 38 while line-contacting therewith along the lines parallel to the optical axis of the lens.

In the lens actuator for the optical head according to the present invention, since the lens casing slides against the magnetic yokes while line-contacting therewith along the lines parallel to the optical axis of the lens, movement of the lens in directions perpendicular to the focusing and tracking directions is completely prohibited, and no jitter is generated. Further, frictional resistance can be reduced enabling the casing to be moved smoothly.

Figure 11:
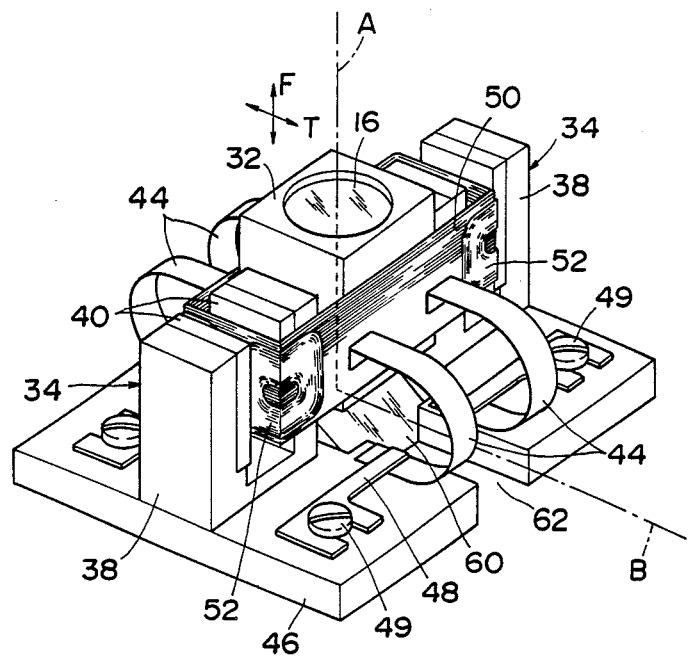
FIG. 11 is a perspective view of still another example of the actuator.

FIG. 11 is a perspective view of one example of an actuator section of an optical head according to the present invention. The lens casing 32 which retains the objective 16 is supported by the curved leaf springs 44 provided on the two sides thereof in such a manner as to be movable in the focusing drection F and the tracking direction T with respect to a base member 46.

The first feature of this arrangement consists in the provision of a plurality of curved leaf springs 44 (two curved leaf springs 44 in this embodiment) for each side of the lens casing 32 in such a manner that they are spaced away from each other.

Each of the curved leaf springs 44 is formed of a thin metal plate which has an excellent property to recover its shape such as beryllium copper plate and phosphor bronze plate, the thin metal plate being shaped into a suitable form. Each of the curved leaf springs has a flat plate portion and a curved portion which continues from the flat plate portion. The curved leaf spring is mounted on the side of the lens casing in such a manner that the flat plate portion thereof is substantially parallel to the optical disk surface, and the proximal end of the curved portion is movably fixed by tightening a pushing plate 48 which is movable in the tracking direction with a screw 49.

A focus coil 50 is fixed to the outside of the lens casing 32, and a track coil 52 which is wound in a square form is attached to each of the short sides of the focus coil 50. The magnetic circuit 34 is provided on each of the two sides of the lens casing 32 which are deviated by 90 degrees from the sides thereof on which the curved leaf springs 44 are mounted. Each of the magnetic circuits 34 has a U-shaped yoke 38 mounted on the base member 46, and the permanent magnets 40 attached on the opposing inner surfaces of the magnetic yoke 38, between which one of the short sides of the focus coil 50 and part of the track coil 52 are placed.

The second feature of this arrangement consists in the connection of the winding ends of the focus coil 50 and the track coils 52 with the respective coil side ends of the curved leaf springs 44, and the connection of the coils to an external circuit through this connection. The focus coil 50 has two winding ends which are connected to the respective curved leaf springs 44 by soldering. The track coils 52 which are provided in the number of four have a total of eight winding ends. However, since the four track coils 52 are connected in series, they have two winding ends, and these two winding ends are connected to the remaining two curved leaf springs 44, respectively. In consequence, connection of a very thin magnet wire is done at its movable portion, and there is no need for drawing out the wire. This ensures protection of the wire, and facilitates handling thereof.

The third feature of this arrangement consists in the provision of a reflector 60 on the opposite side of the objective 16 from a side on which the optical disk is positioned (i.e., in the lower portion as viewed in FIG. 11) which ensures that light passes between the adjacent curved leaf springs 44 located on one of the sides of the lens casing substantially parallel to the optical disk surface, as shown by a dot-dashed line B in FIG. 11. This is made possible because the two curved leaf springs 44 are separated from each other one one of the two sides of the lens casing. This arrangement enables an optical system to be disposed in a plane. As shown in FIG. 11, the gap between the lens casing 32 and the base member 46 can be made smaller by the provision of a notch 62 at a portion of the base member 46, further reducing the thickness of the device.

Figure 12:
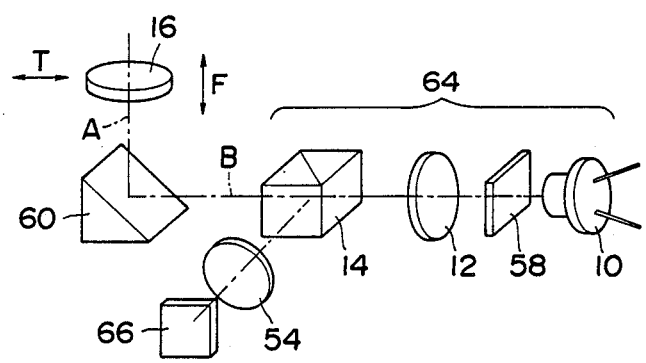
FIG. 12 shows an example of an optical system that can be incorporated in the actuator of FIG. 11.

In FIG. 12 showing one example of the structure of an optical system which can be incorporated in the above-described lens actuator, an optical system 64 is disposed parallel to the optical disk surface. More specifically, the semiconductor laser 10, a diffraction grating 58, the collimeter 12, and the beam splitter 14 are disposed in a straight-line extending from the reflector 60 and forming a right angle with the optical axis A of the objective 16. A cylindrical lens 54 and a divided photodiode 66 are disposed in such a manner that they form a right angle with the above-described straight-line extending from the reflector 60.

As will be clear from the foregoing description, the lens casing 32 is supported by the curved leaf springs 44 provided on the two opposing side thereof in such a manner that the casing 32 is movable in the focusing direction F and the tracking direction T. A current is supplied to the focus coil 50 and the track coils 52 from the external circuit (not shown) through the curved leaf springs 44 so as to drive the lens casing 32 to a predetermined position by the interaction of the coil currents and the magnetic circuits.

Since the plurality of leaf springs are provided for each side of the lens casing in such a manner as to be separated from each other to retain the lens casing, the objective can be freely moved in both focusing and tracking directions. Further, since the curved leaf springs serve as conductive leads for the focus coil and the track coils, there is no need for drawings long out of a very thin magnet wire. This can prevent breakage of the wire and facilitates handling of the wire.

Furthermore, since the two curved leaf springs are separated on one of the sides of the lens casing, space is generated between the adjacent leaf springs, and a light can be passed therebetween substantially parallel to the optical disk surface. Therefore, if the reflector is provided, the optical system can be disposed parallel to the optical disk surface, reducing the thickness of the optical head as a whole.

Figure 13A:
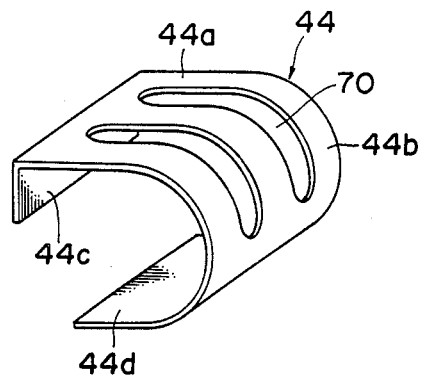
FIGS. 13A and 13B are perspective views of modified examples of the curved leaf spring which constitutes the lens supporting structure for the optical head which is shown in FIG. 9.
Figure 13B:
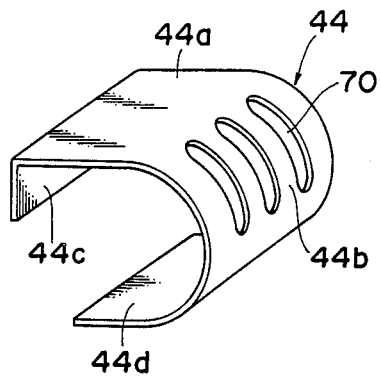
Figure 14:
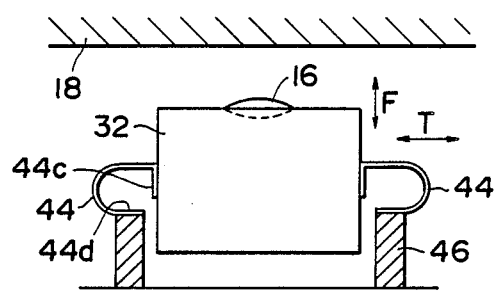
FIG. 14 shows a lens supporting structure which employs the curved leaf springs shown in FIGS. 13A and 13B.

FIGS. 13A, 13B, and 14 show modified examples of the curved leaf spring 44 shown in FIG. 9 or 11. In these examples, one leaf spring 44 is provided on one of the two sides of the lens casing, and the leaf spring 44 has slits 70 which extend along the curved surface. The curved leaf spring 44 shown in FIG. 13A is provided with two slits 70 which start at the flat portion 44a and terminate at the curved portion 44b. The curved leaf spring shown in FIG. 13B has three slits 70 at its curved portion 44b. It is possible to vary modulus of elasticity alone without reducing the tensile strength by varying the number of shape of the slits 70.

In the example shown in FIG. 14, the lens casing 32 for retaining the objective 16 is resiliently supported by the curved leaf springs 44 provided on two sides thereof, in such a manner that the upper surface of the lens casing 32 is substantially parallel to an optical disk surface 18. A vertically bent portion 44c of each of the curved leaf springs 44 is fixed to the lens casing 32, and the lower surface of a horizontally bent portion 44d constituting the other end is fixed to the base member 46, by which the objective 16 is movably supported in the focusing direction (in the direction perpendicular to the optical disk surface 18) and in the tracking direction perpendicular to the focusing direction (in the direction parallel to the optical disk surface 18).

The curved leaf spring 44 is made of an elastic material such as beryllium copper or phosphor bronze, and has a thickness of about 10 $\mu$m.

When the curved leaf spring 44 is constructed in a manner in which any of the above-described modified examples is adopted, the portions of the leaf spring at which it is attached to the lens casing 32 and the base member 46 are made thick enough to provide a sufficient tensile strength. Further, it is also possible to adjust the modulus of elasticity of the leaf spring in the focusing direction F to a suitable value by changing the number or shape of the slits 70 so as to provide suitable vibrations which fit the weight or shape of the lens casing 32. In other words, while the curved leaf spring 44 has a uniform thickness, sufficient tensile strength and modulus of elasticity can be provided by the provision of the slits. This facilitates manufacture of the leaf spring. Thus, it is possible to provide the leaf spring with a desired modules of elasticity by varying the number or shape of the slits without reducing the thickness of the leaf spring, i.e., without deteriorating the tensile strength and fatigue characteristics, thereby providing the lens casing with the mechanical vibration characteristics.

The foregoing description illustrates specific embodiments within the scope of the present invention and are not to be constructed as limiting the scope. It is to be understood that variations and modifications thereof may be made by those skilled in the art without departing from the scope of the invention.

What is claimed is:

1. An optical head apparatus for writing and reading data onto and from an optical disk using an optical beam emitted from a light-emitting element, comprising:

a lens actuator including a lens casing for retaining an objective, magnetic circuits provided on two sides of said lens casing, and a coil disposed in said lens casing and having a part placed in gaps of said magnetic circuits; and a focus detection means including a detection lens means having a plurality of lenses for correcting aberration, a divided photodetector receiving a light beam which has been converged by being passed through said detection lens means, and a differential amplifier for providing a differential output from said divided photodetector, said detection lens means, said divided photodetector and said differential amplifier being disposed in an optical path of light reflected from said optical disk, wherein said detection lens means has a lens which is the closest lens to the divided photodetector, and the optical axis of said lens is inclined with respect to the optical axes of the other lenses to thereby form a substantially linear diffraction pattern.

2. An optical head apparatus according to claim 1, wherein a lens in said detection lens means which is the closest lens to the divided photodetector is inclined by about 10 degrees with respect to said optical axes.

3. An otpical head apparatus according to claim 1, wherein at least one of opposing surfaces of respective magnetic yokes of said magnetic circuits and said lens casing is protruded and curved in such a manner that it has a generatrix parallel to a lens optical axis, so that said lens casing can slide against said magnetic yokes through line-contacts.

4. An optical head apparatus according to claim 3, wherein said lens casing is supported by a curved leaf spring.

5. An optical head apparatus according to claim 4, wherein said curved leaf spring is fixed by a pressing plate which is movable in a tracking direction at the proximal end of its curved portion in a state wherein its position has been adjusted.

6. An optical head apparatus according to claim 4, wherein said curved leaf spring has slits which are extended along its curved surface.

7. An otpical head apparatus according to claim 1, wherein a plurality of curved leaf springs are provided for each side of said lens casing in such a manner as to be separated from each other, said curved leaf springs are made to serve as leads of a focus coil and track coils, and a reflector is mounted on a base member to ensure that light passes between said curved leaf springs provided on one side of said lens casing substantially parallel to the surface of said optical disk.

* * * * *